US009442027B1

(12) United States Patent
Eilersen (10) Patent No.: US 9,442,027 B1
(45) Date of Patent: Sep. 13, 2016

(54) LOAD CELL HAVING AN ELASTIC BODY

(71) Applicant: Nils Aage Juul Eilersen, VedBaek (DK)

(72) Inventor: Nils Aage Juul Eilersen, VedBaek (DK)

(*) Notice: Subject to any disclaimer, the term of this patent is extended or adjusted under 35 U.S.C. 154(b) by 0 days.

(21) Appl. No.: 15/144,059

(22) Filed: May 2, 2016

Related U.S. Application Data (63) Continuation of application No. PCT/DK2014/000058, filed on Dec. 4, 2014.

(30) Foreign Application Priority Data

Jun. 11, 2014 (DK) .................................. 2014 00306

(51) Int. Cl.
| | |
|---|---|
| G01L 1/22 | (2006.01) |
| G01L 1/00 | (2006.01) |
| G01L 1/04 | (2006.01) |
| G01L 1/14 | (2006.01) |
| G01L 1/24 | (2006.01) |

(52) U.S. Cl.
CPC .................. G01L 1/142 (2013.01); G01L 1/14 (2013.01); G01L 1/22 (2013.01); G01L 1/24 (2013.01)

(58) Field of Classification Search
None
See application file for complete search history.

(56) References Cited

U.S. PATENT DOCUMENTS

| | | | |
|---|---|---|---|
| 4,546,838 A | 10/1985 | Ormond | |
| 5,052,505 A | 10/1991 | Naito et al. | |
| 5,408,112 A * | 4/1995 | Tai | G01B 7/20 257/254 |
| 5,438,883 A * | 8/1995 | McLean | B29C 65/18 73/862.541 |
| 6,583,367 B2 * | 6/2003 | Wolfe | B60R 21/0155 177/136 |
| 6,794,587 B2 | 9/2004 | Aumard et al. | |
| 6,835,899 B2 * | 12/2004 | Wolfe | G01G 19/4142 177/144 |
| 7,024,948 B2 * | 4/2006 | Eilersen | G01G 3/12 73/862.627 |
| 8,561,482 B2 | 10/2013 | Aumard et al. | |
| 8,766,113 B2 * | 7/2014 | Kusumoto | G01G 3/1412 177/210 EM |

FOREIGN PATENT DOCUMENTS

| | | |
|---|---|---|
| EP | 1451538 B1 | 8/2005 |
| JP | H07128157 A | 5/1995 |
| WO | 9320418 A1 | 10/1993 |
| WO | 0136924 A1 | 5/2001 |
| WO | 03048700 A2 | 6/2003 |

* cited by examiner

*Primary Examiner* — Peter Macchiarolo
*Assistant Examiner* — Jermaine Jenkins
(74) *Attorney, Agent, or Firm* — David Guerra (57) ABSTRACT

An elastic body load cell including a first beam and a second beam opposite the first beam, a base end and a load receiving end positioned opposite the base end. The first and second beams are connected to the base end and to the load receiving end via flexure points providing elastic deformation sections. A cavity comprising a flexible wall and sensor means is defined in the first and/or second beams with the flexible wall and sensor means placed between the flexure points. The sensor means measures elastic deformation of the elastic body in response to a load. The load cell further includes a lever having a first end connected to the flexible wall, and a second end connected to the opposite beam, the base end or the load receiving end, to transform movement of the second end into deformations of the flexible wall in response to the load.

17 Claims, 10 Drawing Sheets

LOAD CELL HAVING AN ELASTIC BODY

CROSS-REFERENCE TO RELATED APPLICATION

This application is a continuation application under 35 U.S.C. §120 based upon co-pending International Application Serial No. PCT/DK2014/000058 filed on Dec. 4, 2014. Additionally, this continuation application claims the benefit of priority under 35 U.S.C. §365(c) of International Application No. PCT/DK2014/000058 filed on Dec. 4, 2014. The entire disclosure of the prior application is incorporated herein by reference.

BACKGROUND OF THE INVENTION

1. Field of the Invention

The present invention relates to load cells for measuring loads, comprising an elastic body fitted with sensor means to detect the strain or the deformation of the elastic body in response to the load to be measured.

The invention relates more specifically to a precision load cell comprising an elastic body where the elastic body comprises a first beam and a second beam that is positioned opposite to the first beam, a base end and a load receiving end that is positioned opposite the base end where the first and the second beams are connected to the base end and to the load receiving end via flexure points that provide sections for elastic deformation, further a sealed cavity comprising a flexible wall and sensor means for measuring the elastic deformation of the elastic body in response to the load to be measured.

2. Description of the Prior Art

Numerous sensor types are designed with sensor means adapted in a sealed cavity with the sensor means activated by a lever brought through a flexible wall in the sealed cavity. The flexible wall protects the sensor means from humidity and corrosion. Examples are joy sticks and simple force sensors, but precision measurements are in prior art only achieved by precision load cells provided with a parallelogram. Patent EP1451538, describes a precision load cell with sensor means mounted in a sealed cavity placed in the base end of the load cell.

The load cell, according to the patent EP1451538 does in practice display some problems.

One problem arises from temperature induced distortions of the walls of the sealed cavity for example when the rays of the sun shines on one of the walls, increasing the dimensions of this wall and hereby distorting the sealed cavity and influencing the sensor means, which give a transient shift of the zero. Because of the comparably extended geometry of the cavity with an appreciable distance between the walls, temperature equalization will not be complete, take a certain time and the zero signal will therefore only partly, and then slowly return to the correct value.

A further problem is the temperature rise above ambient temperature of the sensor means, caused by the power generated by the electronic signal processing circuits, which normally are mounted in the base end of the load cell near the sensor means. This temperature rise is difficult to compensate for in the zero and slope of the signals of the load cell as it is added to the temperature of the environment.

Another problem is the changing distortion of the cavity and the sensor means through a changing eccentricity of the loads applied on the load cell, which changes the forces in the two beams of the parallelogram. Because the beams are directly hinged on the sealed cavity, the changing forces in the beams will result in varying deformations of the walls of the sealed cavity and hereby influence the sensor means. This changing deformation of the walls of the sealed cavity, with changing eccentricity of the applied loads reduces the obtainable accuracies of the load cell.

Still another problem is the distortion of the sealed cavity and the sensor means when the mounting screws in the base end are tightened for mounting the load cell.

US Patent Application Publication No. US 2003/0111277 describe a number of precision load cells with sensor means placed in a sealed cavity in the base end of the load cell and with a lever connecting a flexible wall of the sealed cavity in the base end to the load receiving part.

The load cells according to US 2003/0111277 display the same problems as the load cell according to EP1451538.

U.S. Pat. No. 5,052,505 and US Patent Application Publication No. US 2011/0232393, both describe load cells where a sealed cavity for mounting sensor means is created by milling a recess in one of the beams of the parallelogram and closing the cavity with a cover.

Load cells according to these patents do both display a problem common to this type of load cell where strain gages are applied to the flexure points of the parallelogram. When a load cell of this design is loaded, the strain gage at one flexure point of a beam will see a positive strain from the bending of this flexure point while a strain gage at the other flexure point of the same beam will see a negative strain. Besides the bending strains there will however also appear strains in the flexure points from the longitudinal forces in the direction of the beam. These forces and strains will have the same sign in both flexure points of a beam and should ideally cancel each other when the signal of the load cell is measured in the normal Wheatstone bridge coupling of the strain gages. Inaccuracies in the strain gages themselves and in the bonding of the strain gages will however result in measurement errors with changing eccentricity of the load applied to the load cell, and these errors are tedious and time consuming to correct with filing or grinding of the flexure points.

It is the object of the invention to provide load cells with sealed cavities with sensor means which are thermally insulated from other parts of the load cell and which are not influenced by variations in the forces in the beams when varying the eccentricity of the load applied to the load cell and which are not influenced by tightening the mounting screws for the load cell.

Therefore, a need exists for a new and improved load cell having an elastic body that can be used for measuring loads. In this regard, the present invention substantially fulfills this need. In this respect, the load cell having an elastic body according to the present invention substantially departs from the conventional concepts and designs of the prior art, and in doing so provide an apparatus primarily developed for the purpose of measuring loads.

BRIEF SUMMARY OF THE INVENTION

In view of the foregoing disadvantages inherent in the known types of load cells now present in the prior art, the present invention provides an improved load cell having an elastic body, and overcomes the above-mentioned disadvantages and drawbacks of the prior art. As such, the general purpose of the present invention, which will be described subsequently in greater detail, is to provide a new and improved load cell having an elastic body and method which has all the advantages of the prior art mentioned heretofore and many novel features that result in a load cell having an elastic body which is not anticipated, rendered obvious, suggested, or even implied by the prior art, either alone or in any combination thereof.

According to the invention, this object is achieved by providing a precision load cell comprising an elastic body where the elastic body comprises a first beam and a second beam that is positioned opposite to the first beam, a base end and a load receiving end that is positioned opposite the base end where the first and the second beams are connected to the base end and to the load receiving end via flexure points that provide sections for elastic deformation, and a sealed cavity comprising a flexible wall and sensor means for measuring the elastic deformation of the elastic body in response to the load to be measured with the sealed cavity placed in the first beam and/or the second beam with the flexible wall and sensor means placed in the body of the beam between the flexure points of the beam. The precision load cell further comprising a lever having a first end and a second end, where the first end is connected to the flexible wall of the sealed cavity and the second end is connected to one or more of the opposite beam, the base end or the load receiving end, in order to transform any relative movement of the second ends of the lever into deformations of the flexible wall in response to the load to be measured. This way and according to the invention the load to be measured, may be measured by various types of sensor means placed in a sealed cavity, which because of a limited geometry and close thermal coupling of the walls provides a fast and nearly complete temperature equalization of the elastic body around the sealed cavity. Furthermore the thermal insulation between the beams and the base end and the load receiving end provided by the flexure points of the beams, limits influx of heat into the sealed cavity and the sensor means. The low strains in the solid walls each side of the sealed cavity placed in a beam provides very low changes of the deformation of the flexible wall of the sealed cavity under varying eccentricity of the load. With the sealed cavity and the sensor means placed in a beam between flexure points no influence on the measurement is seen when tightening the screws for mounting the solid base end and solid load receiving end in an application of the load cell.

In an embodiment of the load cell according to the invention the sealed cavity is placed in the first beam with the flexible wall and sensor means placed in the body of the beam between the flexure points of the beam. The load cell further comprising a lever having a first end and a second end, where the first end is connected to the flexible wall of the sealed cavity and the second end is connected to the opposite beam in order to transform any relative movement of the opposite beam into deformations of the flexible wall in response to the load to be measured. The advantage gained by this embodiment is a sealed cavity with sensor means insulated from humidity, thermal and stray mechanical stresses and a simple activation of the sensor means through the relative displacement of the beams transferred by the lever.

In an embodiment of the load cell according to the invention the sealed cavity is placed in the first beam with the flexible wall and sensor means placed in the body of the beam and between the flexure points of the beam. The load cell further comprising a first lever having a first end and a second end, where the first end is connected to the flexible wall of the sealed cavity and the second end is connected to the opposite beam through a flexure point and a second lever connected to the opposite beam in order to transform any relative movement of the opposite beam into deformations of the flexible wall in response to the load to be measured. The further advantage gained by this embodiment is the possibility to tailor the deformations of the flexible wall according to the specific applications of the load cell by varying the lengths of the levers.

In an embodiment of the load cell according to the invention the sealed cavity is placed in the first beam with the flexible wall and sensor means placed in the body of the beam between the flexure points of the beam. The load cell further comprising a lever having a first end and a second end, where the first end is connected to the flexible wall of the sealed cavity and the second end is connected to the load receiving end in order to transform any relative movement of the load receiving end into deformations of the flexible wall in response to the load to be measured.

In an embodiment of the load cell according to the invention the sealed cavity is placed in the first beam with the flexible wall and sensor means placed in the body of the beam between the flexure points of the beam. The load cell further comprising a lever having a first end and a second end, where the first end is connected to the flexible wall of the sealed cavity and the second end is connected to the base end in order to transform any relative movement of the base end into deformations of the flexible wall in response to the load to be measured.

In an embodiment of the load cell according to the invention sealed cavities are placed in the first beam with flexible walls and sensor means placed in the body of the beam between the flexure points of the beam. The load cell further comprising levers having first ends and second ends, where the first ends are connected to flexible walls of the sealed cavities and the second ends are connected to the opposite beam and/or to the load receiving end and/or to the base end in order to transform any relative movement of the second ends of the levers into deformations of the flexible walls in response to the load to be measured.

In an embodiment of the load cell according to the invention sealed cavities are placed in the first beam and in the second beam with flexible walls and sensor means placed in the bodies of the beams between the flexure points of the beams. The load cell further comprising levers having first ends and second ends, where the first ends are connected to flexible walls of the sealed cavities and the second ends are connected to the flexible walls in the opposite beam and/or to the opposite beam and/or to the load receiving end and/or to the base end in order to transform any relative movement of the second ends of the levers into deformations of the flexible walls in response to the load to be measured.

The advantage gained by this embodiment is the possibility to have dual independent measuring systems for critical applications of the load. In embodiments of the load cells according to the invention first levers connected to flexible walls protrudes through the flexible walls into the sealed cavities for the activation of sensor means.

In embodiments of the load cells according to the invention first levers connected to flexible walls of sealed cavities activates sensor means in the sealed cavities by deforming the flexible walls.

In embodiments of the load cells according to the invention, the sensor means are capacitive and/or inductive and/or resistive and/or optic.

In embodiments of the invention flexure points may be inserted anywhere in the levers for tailoring the deformations of the flexible walls in response to the load to be measured. In embodiments of the invention a flexible wall may have different thicknesses at certain areas in order to facilitate the deformations of the flexible wall in response to the load to be measured.

In embodiments of the invention a flexible wall may have different thicknesses at certain areas in order to facilitate the measurement of the strain in the flexible wall in response to the load to be measured.

In an embodiment of the load cell according to the invention, electronic signal processing circuits are mounted in the sealed cavity and/or in the base end and/or the load receiving end of the load cell.

The advantage gained by this embodiment is that only a few, and then only low power components of the signal processing circuits are mounted in the sealed cavity while the heat generating higher power parts of the signal processing circuits are mounted in the base end. From the base end, the heat may quite easily be dissipated to the environment and will not reach the sealed cavity and the sensor means because of the thermal insulation provided by flexure points of the beams.

In an embodiment of the load cell according to the invention, electronic signal processing circuits which are mounted in the sealed cavity are connected to electronic signal processing circuits in the base end of the load cell through connections adapted in flexure points of the beams of the load cell.

By placing the connections and the preferably laser welded covers as close as possible to the neutral layer in the material of the flexure point, which is around half thickness of the flexure point, the connection and the cover are only bended and not stretched or compressed when the flexure point undergoes deformations, when the load cell is loaded and this reduces any influence on the measurement to an insignificant size.

By increasing the thickness of a flexure point where the connection between the electronic processing circuits is placed, the machining of the groove in the flexure point and the laser welding of the cover is easier to perform.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved load cell having an elastic body that has all of the advantages of the prior art load cells and none of the disadvantages.

It is another object of the present invention to provide a new and improved load cell having an elastic body that may be easily and efficiently manufactured and marketed.

An even further object of the present invention is to provide a new and improved load cell having an elastic body that has a low cost of manufacture with regard to both materials and labor, and which accordingly is then susceptible of low prices of sale to the consuming public, thereby making such load cell having an elastic body economically available to the buying public.

Still another object of the present invention is to provide a new load cell having an elastic body that provides in the apparatuses and methods of the prior art some of the advantages thereof, while simultaneously overcoming some of the disadvantages normally associated therewith.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE INVENTION

Referring now to the drawings, and particularly to FIGS. 1-10B, an embodiment of the load cell having an elastic body of the present invention will be described.

Figure 1:
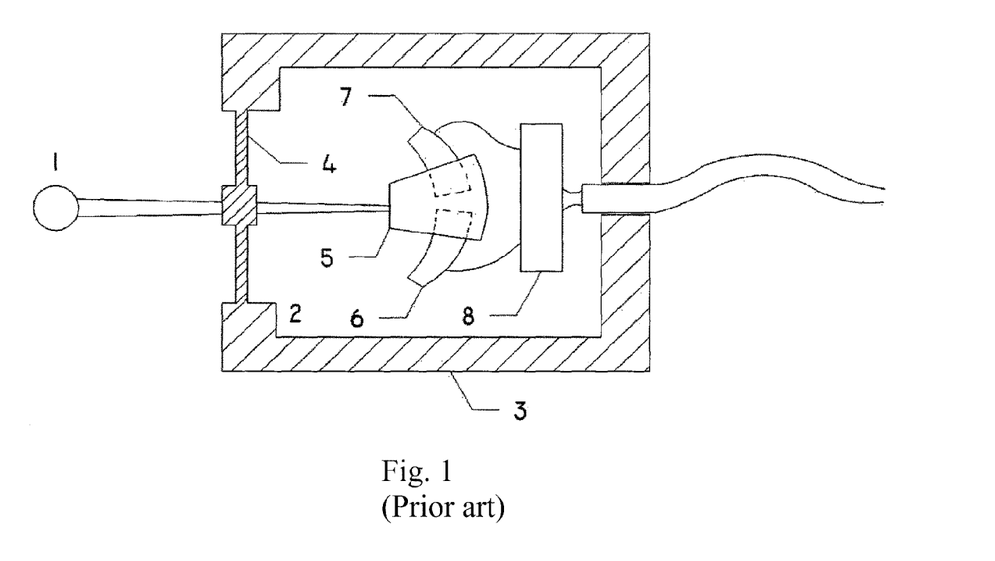
FIG. 1 is a cross-sectional view of prior art of a simple sensor with a lever protruding through a flexible wall into a sealed cavity in the sensor body for activating sensor means.

The sensor in FIG. 1 shows, as prior art, a simple sensor where the lever 1, is protruding into the sealed cavity 2, placed in the sensor body 3, through the flexible elastic wall 4, for activating the capacitive sensor means, by moving the grounded vane 5, in relation to the capacitance sensors 6 and 7 when the lever 1 is activated. The capacitance sensors 6 and 7 are connected to the capacitance measuring circuit 8.

This type of sensor, with different sensor means, is widely used as a joy stick for controlling machinery and the flexible wall protects the sensor means from humidity and corrosion in machinery in tough environments.

It is easily seen that a sensor according to FIG. 1 is quite unsuitable as a load cell because the forces for activating the sensor means are dependent on the length of the lever 1.

Figure 2:
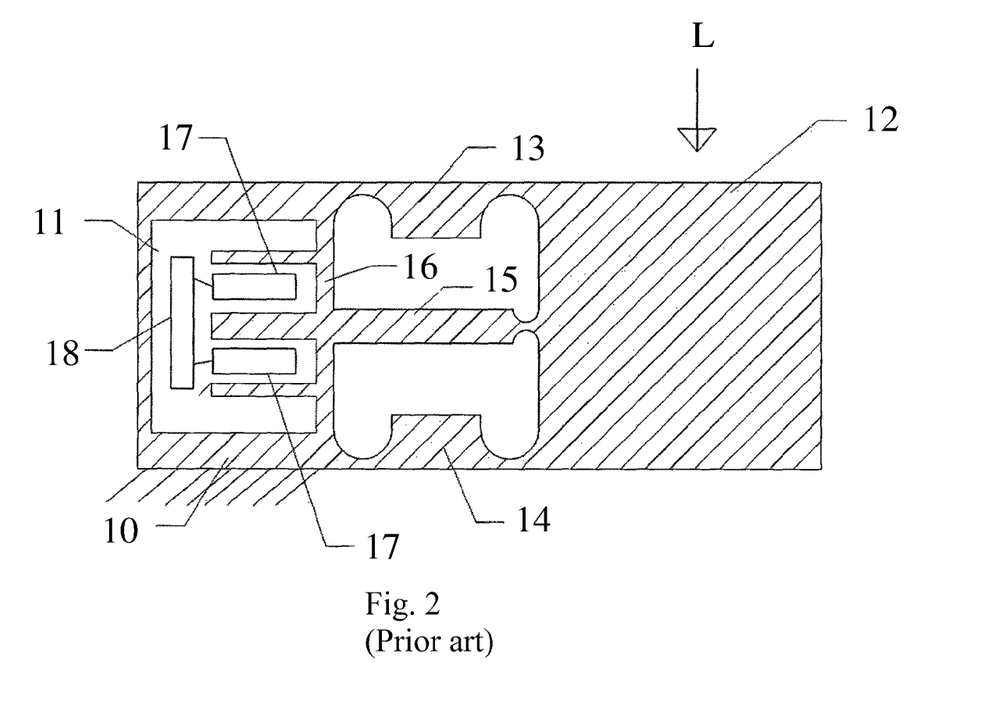
FIG. 2 is a cross-sectional view of prior art of a precision load cell with an elastic body, comprising a base end with a sealed cavity, a load receiving part and a parallelogram consisting of two beams connecting the base end and the load receiving part, and a lever connecting the load receiving part with a flexible wall of the sealed cavity for activating sensor means, adapted in the sealed cavity in the base end.

The load cell of FIG. 2 shows, as prior art, a precision load cell with an elastic body, comprising a base end 10, a sealed cavity 11, a load receiving part 12, and a parallelogram consisting of the two beams 13 and 14, connecting the base end 10 and the load receiving part 12, a lever 15 connecting the load receiving part 12 with a flexible wall 16 of the sealed cavity 11, for activating sensor means 17, adapted in the sealed cavity 11, which also contains the signal processing circuit 18.

The heat generated by the signal processing circuit 18 is causing a temperature rise of the sealed cavity 11 which will be added to the temperature of the environment and hereby make the temperature compensation difficult.

A changing eccentrically applied load L on the load receiving part 12 will give changing forces in the beams 13 and 14, which again will give dimensional changes of the sealed cavity 11 and hereby influence the measurement.

Figure 3:
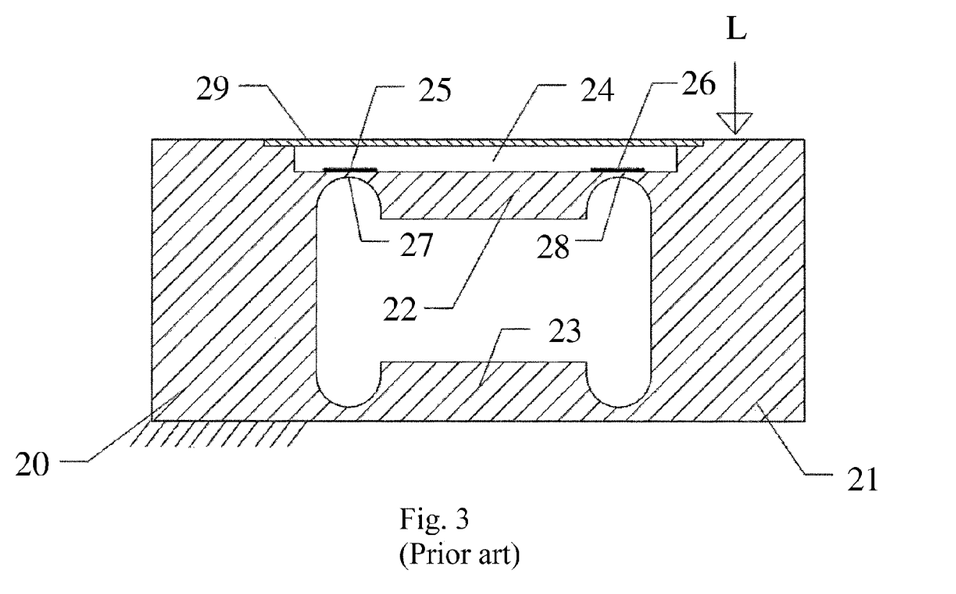
FIG. 3 is a cross-sectional view of prior art of a precision load cell with an elastic body, comprising a base end, a load receiving part and a parallelogram consisting of two beams connecting the base end and the load receiving part, with a sealed cavity in one of the beams with strain gages applied to the flexure points of the beam.

With the comparably thin walled sealed cavity it is also difficult in practice to avoid distortions of the sealed cavity and shifts of the zero signal when tightening the screws for mounting the base end of the load cell in the application. The load cell of FIG. 3 shows, as prior art, a precision load cell with an elastic body, comprising a base end 20, a load receiving part 21 and a parallelogram consisting of the two beams 22 and 23, connecting the base end 20 and the load receiving part 21, a sealed cavity 24 in the beam 22 with strain gages 25 and 26, applied in the flexure points 27 and 28. A cover 29 seals the cavity 24 and the strain gages 25 and 26 from the environment. When a load L is applied to the load receiving part 21, the strain gage 25 will be stretched by the bending of the flexure point 27, while the strain gage 26, will be compressed by the bending of the flexure point 28 and it is these strains which result in the signals from the strain gages which are normally connected in a Wheatstone bridge configuration. Longitudinal forces will however also be present in the beams; but they will be the same at both ends of the beam and will give strains of the same sign in the gages which ideally will cancel in the Wheatstone bridge configuration. Even relatively small differences in the characteristics and the bonding of the strain gages will however give errors when a changing eccentricity of the load give changing longitudinal forces in the flexure points.

The invention will now be described in further details with reference to FIG. 4, which is a basic embodiment of the invention with an elastic body 30, comprising a base end 31, a load receiving part 32, a first beam 33 with the sealed cavity 34 and a second beam 35, each beam with flexure points 36 at each end, at least one lever 37 protruding into the sealed cavity 34 through a flexible wall 38 for activating the capacitive sensor means 39, adapted in the sealed cavity 34, with the lever 37 connected to the beam 35 through the flexure point 40 and a second lever 41. It can be appreciated that the cavity 34 can be defined in any one of the first beam 33, the second beam 35 or the first and second beams by at least solid side walls. The side walls are capable of absorbing longitudinal forces in the first and second beams on each side of the cavity 34.

The lever 37 may include a lever first end and a lever second end, with the lever first end connected to the flexible wall 38 of the cavity 34. The lever second end is connected to one or more of the first beam 33, the second beam 35, the base end 31 or the load receiving end 32, and is opposite the lever first end. The lever second end is adapted to transform any relative movement of the lever second end of the lever 37 into deformations of the flexible wall 38 in response to the load L to be measured;

The flexible wall 38 has a configuration capable of sealing the cavity 34 and protecting the sensor means 39 from humidity and corrosion. The lever 37 is connected to the flexible wall 38 of the cavity 34 which activates the sensor means 39 in the cavity 34 by deforming the flexible wall 38.

The lever 37 may include a first lever including the lever first end, and a second lever 41 including the lever second end. The first lever and the second lever are connected to each other by way of a lever flexure point 40. The first lever, the second lever 41 and the lever flexure point 40 have a configuration capable of transforming any relative movement of one of the first beam 33 and/or the second beam 35 into deformations of the flexible wall 38 in response to the load L.

The sensor means 39 can be, but not limited to, a capacitive, inductive, resistive or optical sensing system.

Figure 4:
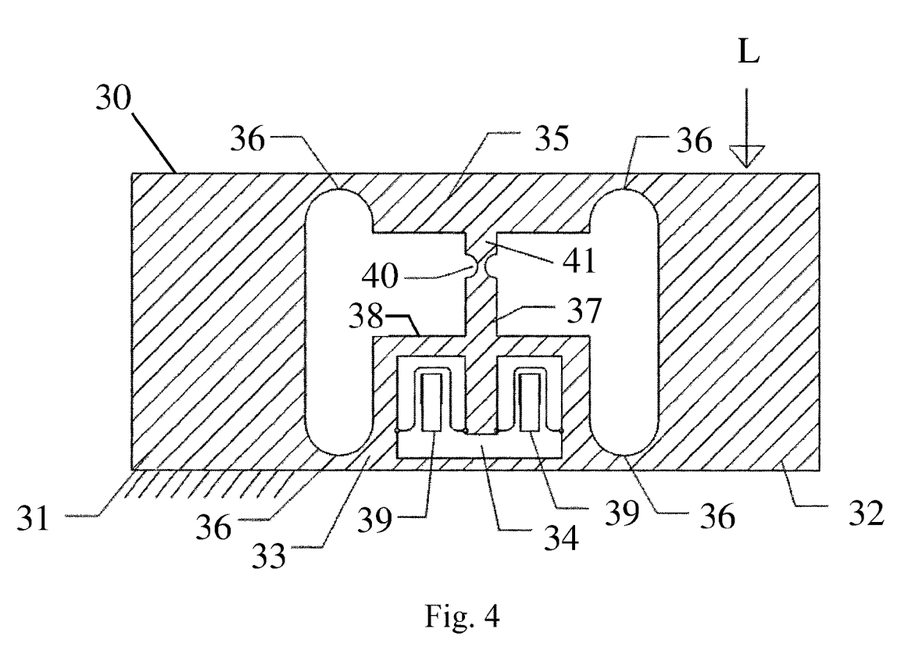
FIG. 4 is a cross-sectional view of a basic embodiment of the present invention with an elastic body, comprising a base end, a load receiving part, a first beam with a sealed cavity with a flexible wall and sensor means activated by a first lever protruding through the flexible wall of the sealed cavity and connected to the second beam through a flexure point and a second lever.
Figure 9:
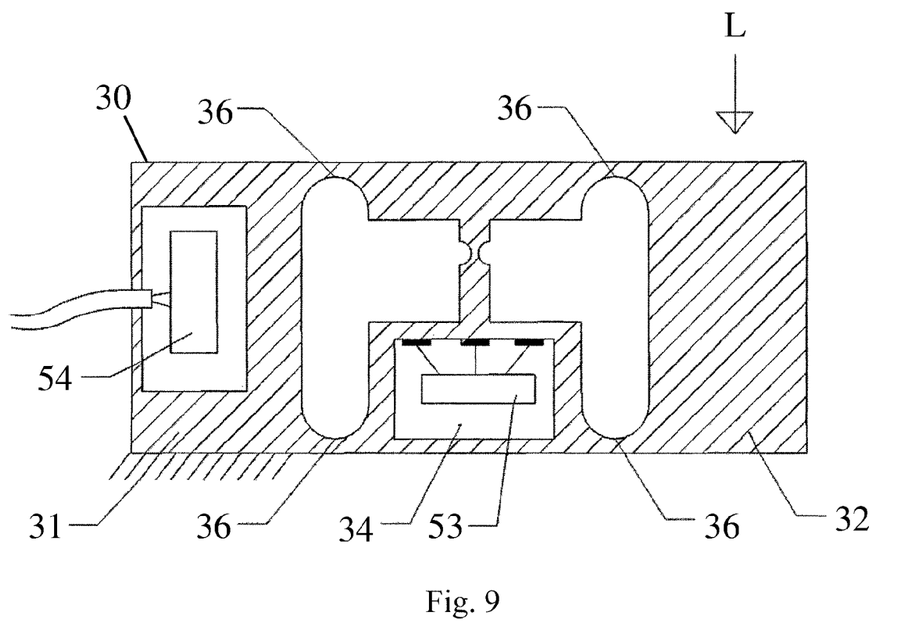
FIG. 9 is a cross-sectional view of an embodiment of the present invention with electronic signal processing circuits divided between the sealed cavity and the base end of the load cell.

The load cell according to FIG. 4 will only show small measurement errors from transient temperature shifts of the environment because of a rather limited size and comparably thick walls of the sealed cavity. Errors from heat dissipated from the electronic circuits mounted in the base end as shown in FIG. 9 will be insignificant because of the thermal insulation provided by the small cross section of the flexure points.

Errors from changing eccentricity of the load L applied to the load cell are reduced significantly because the solid sidewalls of the sealed cavity will absorb the longitudinal forces in the beams without the flexible wall and sensor means being influenced.

Errors caused by tightening the mounting screws are strongly reduced because of the mechanical insulation provided by the flexure points between the solid base end, the solid load receiving end and the sensor means placed in the sealed cavity in the body of the beam.

Figure 5:
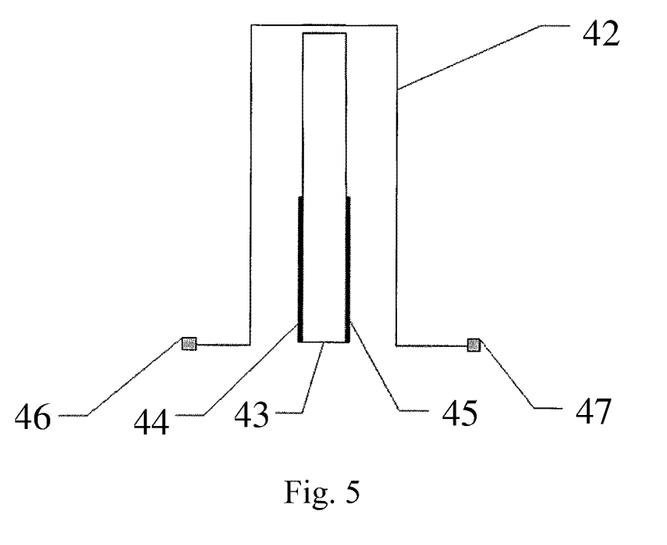
FIG. 5 is an example of capacitive sensor means.

FIG. 5 is an example of a capacitive sensor means that can be used with the present invention. The capacitive sensor means can include a flat U-shaped spring 42, an insulating body 43 with conducting areas 44 and 45 for connecting to suitable capacitance measuring circuits and with anchor points 46 and 47 which are for example to be welded to the end of the lever 37 of FIG. 4 and to a suitable point in the sealed cavity 34.

Figure 6:
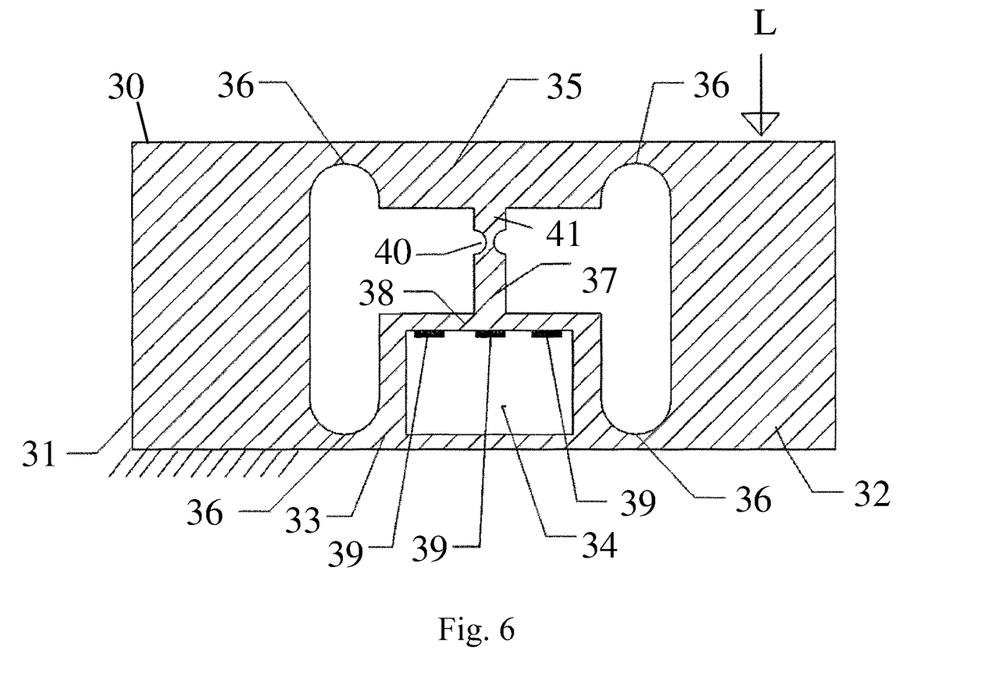
FIG. 6 is a cross-sectional view of a basic embodiment of the present invention with an elastic body, comprising a base end, a load receiving part, a first beam with a sealed cavity with a flexible wall and sensor means activated by a first lever connected to the flexible wall of the sealed cavity and connected to a second beam through a flexure point and a second lever.

FIG. 6 is another basic embodiment of the invention with an elastic body 30, comprising a base end 31, a load receiving part 32, a beam 33 with the sealed cavity 34 and the beam 35, each beam with flexure points 36 at each end. A lever 37 connected to the flexible wall 38 of the sealed cavity 34 activates the strain sensor means 39 for measuring the deformations of the flexible wall when the lever 37 is connected to the beam 35 through the flexure point 40 and a second lever 41.

The load cell according to FIG. 6 will show the same robustness against unwanted stray influences as the load cell according to FIG. 4.

Figure 7:
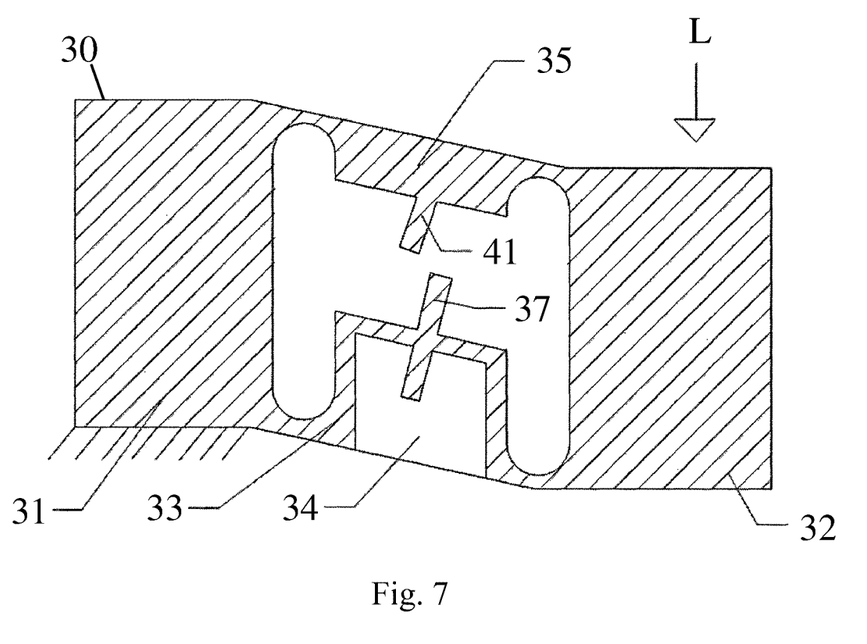
FIG. 7 is a cross-sectional view of a basic embodiment of the present invention in a situation with the elastic body loaded.

FIG. 7 is an embodiment of the invention of FIG. 4 where the elastic body 30 is loaded L while the flexure point 40 is opened. The deflections of the beams 33 and 35 are shown exaggerated to demonstrate how the levers 37 and 41 are shifted in relation to each other, but also that the flexible wall 38 does not undergo deformations with the flexure point 40 opened.

Figure 8:
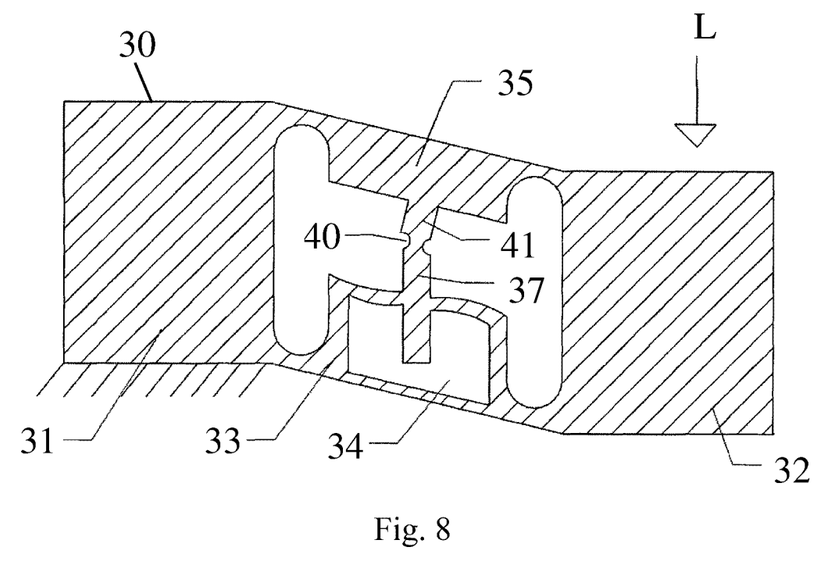
FIG. 8 is a cross-sectional view of a basic embodiment of the present invention in another situation with the elastic body loaded and the flexure point closed.

FIG. 8 is the basic embodiment of the invention of FIG. 4 where the elastic body 30 is loaded L, the flexure point is closed and the deflections of the beams 33 and 35 are shown exaggerated to demonstrate how the flexible wall undergoes deformations through the angular deflection of the lever 37 when the lever 37 is connected to the beam 33 through the flexure point.

It is seen from FIG. 7 and FIG. 8 that the angular deflection of the lever 37 is a simple function of the angular deflections of the beams 33 and 35 only, which is a prerequisite for a stable measurement.

FIG. 9 is a basic embodiment of the invention where the electronic signal processing circuits are divided in a circuit 53, which is mounted in the sealed cavity 34 and a signal processing circuit 54, which is mounted in the base end 31 of the load cell. By this embodiment, where the components of the circuit 53 in the sealed cavity 34 are preferably only a few low power components which generate essentially no rise of the temperature, only the temperature shifts of the environment have to be compensated.

The heat generated by the possibly higher power parts of the signal processing circuit 54, which is mounted in the base end 31, may quite easily be dissipated to the environment and will not reach the sealed cavity because of the thermal insulation provided by flexure points 36 of the beams.

Figure 10A:
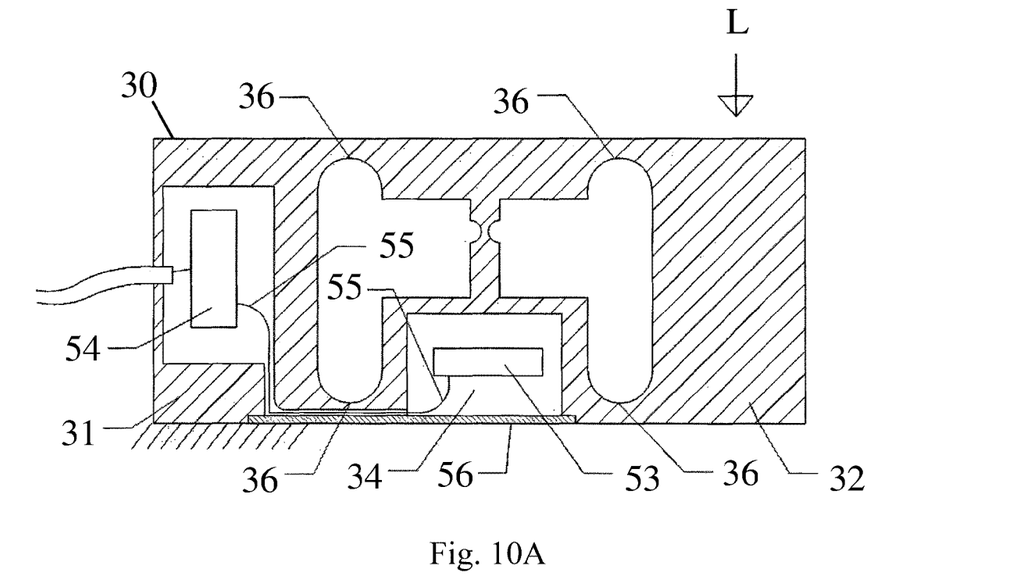
FIG. 10A is a cross-sectional view of an embodiment of the present invention with the electronic signal processing circuits in the sealed cavity and the signal processing circuits in the base end of the load cell connected through connections adapted in flexure points of the beams.

FIG. 10A is another basic embodiment of the invention where a connection 55 between the circuit 53 in the sealed cavity 34 and the signal processing circuit 54 in the base end 31 is adapted in a flexure point 36 of a beam.

The connections 55 are preferably placed in grooves milled in one of the flexure points 36, with the groove preferably being sealed together with the sealed cavity 34 by the preferably laser welded cover 56.

Figure 10B:
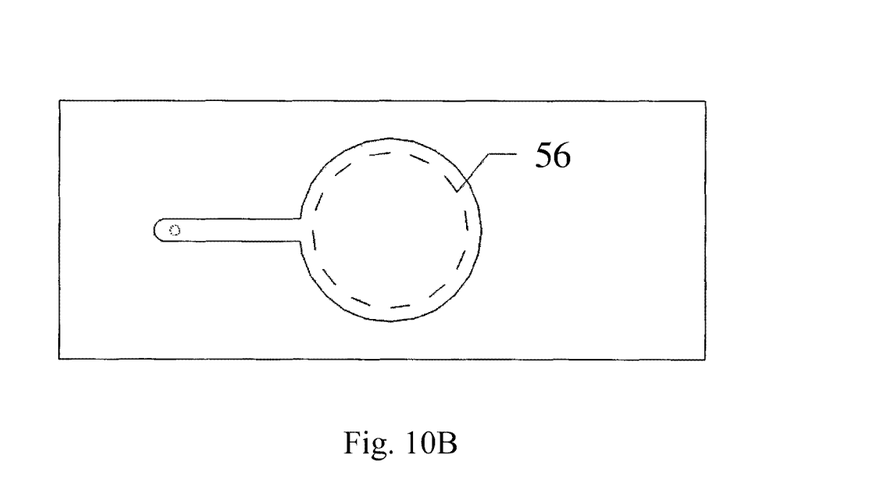
FIG. 10B is a bottom elevational view of the embodiment of the present invention of FIG. 10A showing the cover for the sealed cavity.

FIG. 10B is showing the cover 56 of the load cell of FIG. 10A.

While embodiments of the load cell having an elastic body have been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. And although measuring loads have been described, it should be appreciated that the load cell having an elastic body herein described is also suitable for measuring other parameters.

Since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A load cell comprising:
    an elastic body comprising at least one a first beam and at least one second beam that is positioned opposite to the first beam, a base end and a load receiving end that is positioned opposite the base end, where the first and the second beams are connected to the base end and to the load receiving end by way of flexure points having a configuration capable of providing sections for elastic deformation;
    a cavity defined in one of the first beam, the second beam and the first and second beams by at least solid side walls, the side walls having a configuration capable of absorbing longitudinal forces in the first and second beams on each side of the cavity, the cavity comprising at least one flexible wall, and at least one sensor means having a configuration capable of measuring elastic deformation of the elastic body in response to a load to be measured, the flexible wall and the sensor means being located between the flexure points; and
    a lever having a lever first end and a lever second end, where the lever first end is connected to the flexible wall of the cavity and the lever second end is connected to one or more of the first beam, the second beam, the base end or the load receiving end, opposite the lever first end, in order to transform any relative movement of the lever second end into deformations of the flexible wall in response to the load to be measured;
    wherein the lever is connected to the flexible wall and has a configuration capable of activating the sensor means in the cavity by deforming the flexible wall.

2. The load cell according to claim 1, wherein the flexible wall has a configuration capable of sealing the cavity and protecting the sensor means from humidity and corrosion.

3. The load cell according to claim 1, wherein the lever second end is connected to one of the first beam and the second beam opposite the flexible wall, wherein the lever has a configuration capable of transforming any relative movement of one of the first beam and the second beam into deformations of the flexible wall in response to the load to be measured.

4. The load cell according to claim 1, wherein the lever comprises a first lever including the lever first end, and a second lever including the lever second end, with the first lever and the second lever being connected to each other by way of a lever flexure point, wherein the first lever, the second lever and the lever flexure point having a configuration capable of transforming any relative movement of one of the first beam and the second beam into deformations of the flexible wall in response to the load to be measured.

5. The load cell according to claim 1, wherein the lever second end is connected to the load receiving end in order to transform any relative movement of the load receiving end into deformations of the flexible wall in response to the load to be measured.

6. The load cell according to claim 1, wherein the lever second end is connected to the base end in order to transform any relative movement of the base end into deformations of the flexible wall in response to the load to be measured.

7. The load cell according to claim 1, wherein the lever is a plurality of levers each having a lever first end and a lever second end, the lever first end of each of the levers is connected to the flexible wall of the cavity, the lever second end of each of the levers is connected to one or more of the first beam, the second beam, the base end or the load receiving end, opposite the lever first end, in order to transform any relative movement of the second ends of the levers into deformations of the flexible wall in response to the load to be measured.

8. The load cell according to claim 1, wherein the lever is a plurality of levers each having a lever first end and a lever second end, the lever first end of each of the levers is connected to the flexible wall of the cavity, the lever second end of each of the levers is connected to one or more of at least one flexible wall in the first beam, at least one flexible wall in the second beam, the first beam, the second beam, the base end or the load receiving end, opposite the lever first end, in order to transform any relative movement of the second ends of the levers into deformations of the flexible walls in response to the load to be measured.

9. The load cell according to claim 1, wherein at least a portion of the lever protrudes through the flexible wall into the cavity for activation of the sensor means.

10. The load cell according to claim 1, wherein the sensor means is selected from the group consisting of capacitive, inductive, resistive, and optical.

11. The load cell according to claim 1 further comprises at least one electronic signal processing circuit mounted in one of the cavity, the base end and the load receiving end of the load cell.

12. The load cell according to claim 1 further comprises at least one electronic signal processing circuit mounted in the cavity which is connected to at least one electronic signal processing circuit mounted in one of the base end and the load receiving end of the load cell through at least one connection receivable through at least one of the first and second beams of the load cell.

13. The load cell according to claim 12, wherein the connection is received through at least one groove defined in at least one of the first and second beams and adjacent to one of the flexure points, the groove is in communication with the cavity.

14. The load cell according to claim 13 further comprises a cover having a configuration capable of sealing the cavity and the groove.

15. The load cell according to claim 1, wherein the sensor means is at least one capacitive sensor including a flat U-shaped spring, an insulating body including conducting areas connectable to capacitance measuring circuits, and anchor points that are attached the lever.

16. The load cell according to claim 1, wherein the flexure points are each a void defined in the elastic body with arcuate ends, with the voids being mirror images of each other on opposite sides of the lever when the elastic body is not deformed.

17. The load cell according to claim 1, wherein the cavity is defined between ends of the flexure points, respectively.

* * * * *